Oct. 11, 1960 J. G. LOCKLIN 2,955,814
AIR SPRING ASSEMBLY
Filed April 24, 1958 2 Sheets-Sheet 1

INVENTOR.
John G. Locklin
BY
W. S. Pettigrew
ATTORNEY

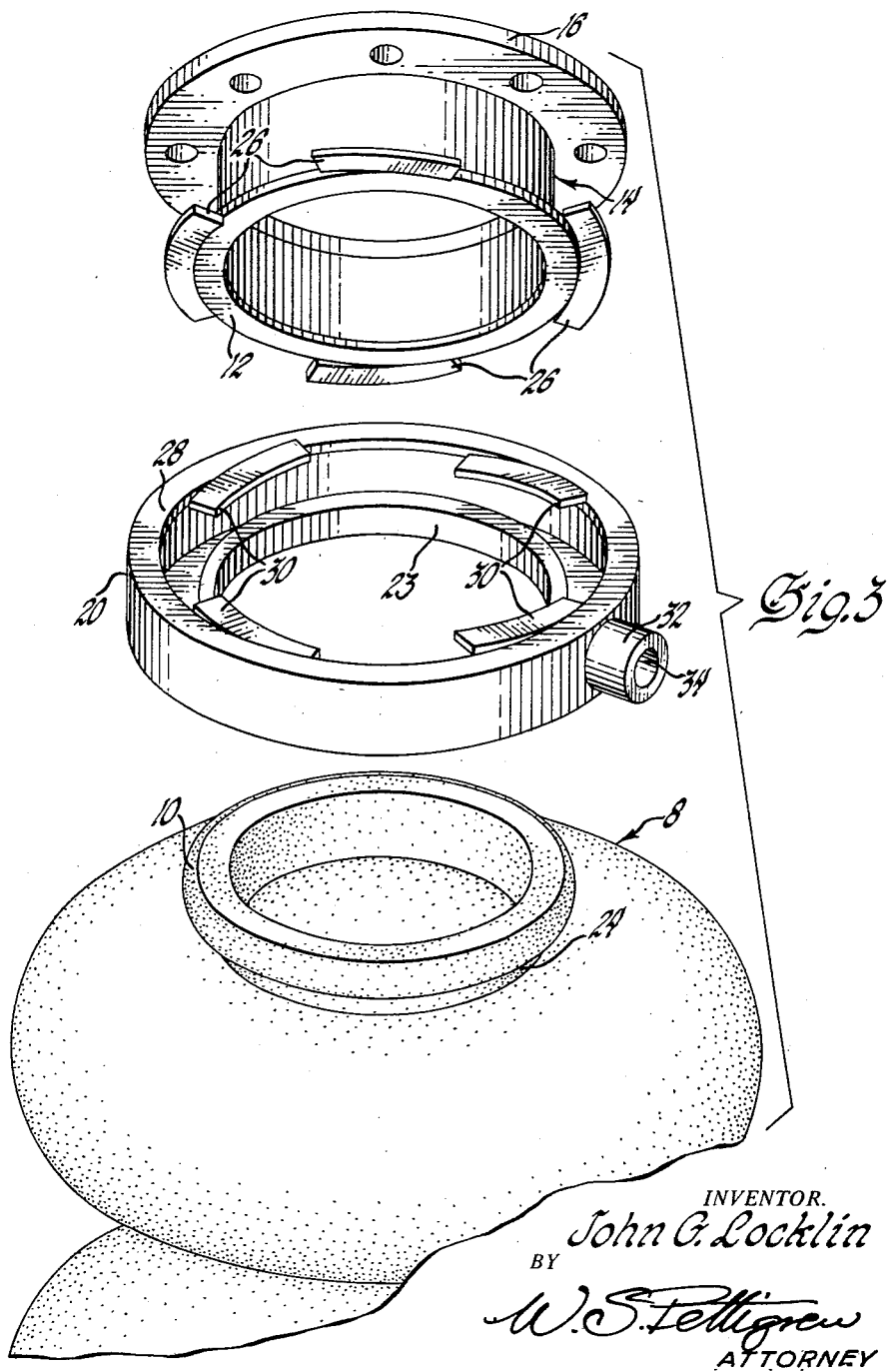

the outer periphery of said first flange 2,955,814

AIR SPRING ASSEMBLY

John G. Locklin, Birmingham, Mich., assignor to General Motors Corporation, Detroit, Mich., a corporation of Delaware Filed Apr. 24, 1958, Ser. No. 730,665

1 Claim. (Cl. 267—65)

This invention relates to pneumatic vehicle suspension and more particularly to air spring construction therefor.

In the past, it has been customary to effect sealing engagement between an open ended bellows and adjacent support structure in the manner shown for example in U.S. 2,208,537 Brown, wherein the beaded mouth of the bellows is drawn into sealing engagement with the adjacent face of the spring support by means of an annular clamping ring which is secured to the support by a plurality of circumferentially spaced bolts. Although adequate insofar as effecting a satisfactory mechanical seal, assembly and disassembly of such springs in inherently time consuming.

An object of the present invention is to provide an improved air spring.

Another object is to provide an air spring having improved means for attachment and detachment from the associated vehicle parts.

A further object is to provide a bellows type air spring including inflexible attachment portions which are adapted for quick engagement and disengagement.

Still another object is to provide a device of the type described in which the attachment means comprises annular members which effect interlocking engagement upon limited relative rotation.

Yet a further object is to provide a device of the type described wherein one of the annular members is formed and arranged so as to accomplish air tight sealing engagement between the other annular member and a cooperating bead portion of the bellows.

These and other objects, advantages and features of the invention will become more fully apparent as reference is had to the accompanying specification and drawings wherein:

Fig. 3 is an exploded perspective view illustrating the form and relationship of the individual parts forming the air spring assembly.

Figure 1:
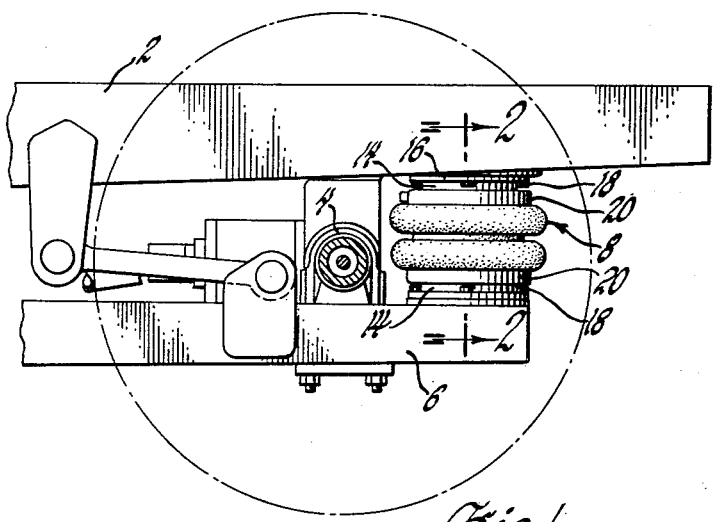
Fig. 1 is a fragmentary plan view of a vehicle suspension incorporating an air spring assembly in accordance with the present invention.

Referring now to the drawings and particularly Fig. 1, the reference numeral 2 designates a conventional vehicle frame. Disposed beneath frame 2 is a wheel axle assembly 4 which extends transversely thereof and has its opposite ends supported on a pair of trailing beams 6. Located rearwardly of axle 4 and extending between each beam 6 and frame 2 is an air spring assembly including a conventional double convolution bellows 8.

Figure 2:
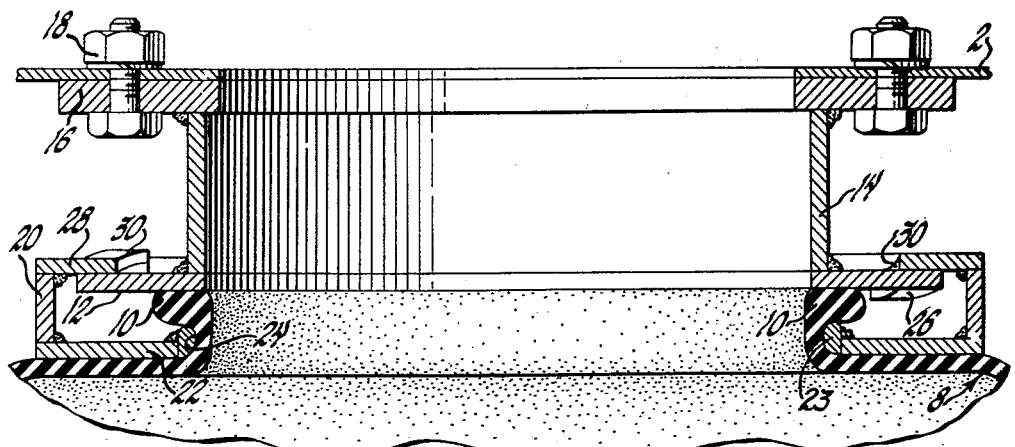
Fig. 2 is an enlarged sectional elevation looking in the direction of arrows 2—2 of Fig. 1.

As seen best in Fig. 2, bellows 8 is provided at its lower and upper ends with an enlarged annular bead 10 which is adapted for air tight sealing engagement with the flanged lower annular face 12 of a cylindrical upper spring support 14. At its upper end, support 14 is formed with an upper flange 16 which is secured to frame 2 by means of a plurality of machine bolts 18.

In accordance with the present invention, the mechanical seal between the bead 10 of bellows 8 and the face 12 of support 14 is obtained by means of rotational interlocking engagement between an annular locking ring 20 of C-shaped cross section and the outer periphery of flange 12. Locking ring 20 includes a lower inturned continuous flange 22 which surrounds the necked in portion 24 of bellows 8. The inner periphery of the flange 22 terminates with an upwardly extending portion 23 that rests within and abuts the necked-in portion 24 of the bead 10. As seen best in Fig. 3, the outer periphery of flange 12 is formed with circumferentially spaced radially outwardly directed cam segments 26 while locking ring 20 is formed with an upper inturned flange 28 having a plurality of radially inwardly directed circumferentially spaced cam segments 30 which are adapted for vertical overlapping and interlocking engagement with cam segments 26. To assure ease of assembly, cam segments 26 and 30, respectively, are of equal angular extent and are separated by angular spacing of corresponding extent. On installation, bead 10 of bellows 8 is compressed and retained between the portion 23 of ring 20 and flange 12 of support 14 by initially rotating ring 20 to a position wherein cam surfaces 26 register with the spaces between cam surfaces 30. Ring 20 is then raised slightly so that the leading edges of cams 30 overlap the trailing edges of cams 26. Subsequent counterclockwise rotation of ring 20 induces ramp action between the overlapping cam surfaces 26 and 30 causing the portion 23 of ring 20 to move upwardly relative to flange 12, effecting a predetermined compressive loading of bead 10 against flange 12. To facilitate application of sufficient turning force on ring 20, the latter is preferably provided with an integral radially extending boss 32 having an aperture 34 formed therein which forms an engagement socket for a suitable spanner wrench, not shown. In practice, the predetermined sealing force required to be applied to bead 10 may be easily established by determining the ratio of sealing force to spanner torque.

An air spring assembly according to the present invention not only provides an effective and reliable seal between the flexible bellows and associated support, but in addition greatly reduces initial assembly time in comparison to structure heretofore available. Furthermore, periodic field disassembly for inspection or other purposes is readily accomplished with minimum down time.

While but one embodiment of the invention has been shown and described, it will be apparent that other changes and modifications may be made therein. It is, therefore, to be understood that it is not intended to limit the invention to the embodiment shown, but only by the scope of the claim which follows.

What is claimed is:

In an air spring assembly for vehicles including a flexible bellows and a frame member, said flexible bellows having a body portion and a mouth terminating with an annular radially outwardly extending bead, a neck portion integrally connecting said bead and said body portion, a clamping assembly for joining said flexible bellows to said frame member comprising a cylindrical support member having spaced first and second radially outwardly extending flanges, means for connecting said first flange to said frame member, a plurality of circumferentially spaced inclined ramp portions formed on said second flange, an annular ring surrounding said bead, spaced first and second radially inturned flanges formed on said ring and disposed in planes substantially normal to the axis of said flexible bellows, said second flange of said annular ring extending under and engaging said bead and having a portion extending axially toward said first flange of said annular ring and abuttingly engaging said neck portion of said bellows, circumferentially spaced inclined ramp portions on said first flange of said annular ring corresponding in number to the ramp portions on said second flange of said cylindrical member, said ramp portions on said flange of said annular ring being adapted to interlock with the corresponding ramp portions on said flange of said cylindrical support member upon limited rotation of said annular ring whereby said axially extending portion of said annular ring compresses and retains said bead between said second flange of said annular ring and said second flange on said cylindrical support member to effect airtight engagement.

References Cited in the file of this patent

UNITED STATES PATENTS

| | | |
|---|---|---|
| 1,085,818 | Oxnard | Feb. 3, 1914 |
| 2,399,115 | Hansen | Apr. 23, 1946 |
| 2,607,383 | Christopherson | Aug. 19, 1952 |